(12) United States Patent
Park et al.

(10) Patent No.: US 7,244,794 B2
(45) Date of Patent: Jul. 17, 2007

(54) METHOD FOR PRODUCING PROPYLENE POLYMER HAVING A VERY HIGH MELT-FLOWABILITY

(75) Inventors: Joon-Ryeo Park, Daejeon (KR); Young-Joo Lee, Incheon (KR); Jin-Kyu Ahn, Seoul (KR); Ho-Sik Chang, Dajeon (KR)

(73) Assignee: Samsung Total Petrochemicals Co., Ltd., Seosan-shi, Chungcheongnam Province (KR)

( * ) Notice: Subject to any disclaimer, the term of this patent is extended or adjusted under 35 U.S.C. 154(b) by 0 days.

(21) Appl. No.: 11/157,262

(22) Filed: Jun. 21, 2005

(65) Prior Publication Data

US 2006/0223959 A1      Oct. 5, 2006

(30) Foreign Application Priority Data

Mar. 29, 2005   (KR) .................... 10-2005-0025759

(51) Int. Cl.
*C08F 4/42*     (2006.01)
(52) U.S. Cl. ............. 526/125.3; 526/351; 526/124.2; 526/124.5; 402/103; 402/132; 402/133; 402/134; 402/158
(58) Field of Classification Search ............. 526/351, 526/125.3, 124.2, 124.5; 502/103, 132, 133, 502/134, 158
See application file for complete search history.

(56) References Cited

U.S. PATENT DOCUMENTS

| 4,952,649 | A |   | 8/1990  | Kioka et al. ............... 526/125 |
| 5,652,303 | A | * | 7/1997  | Ishimaru et al. ......... 526/125.3 |
| 5,693,729 | A | * | 12/1997 | Fushimi et al. .......... 526/125.3 |
| 6,384,160 | B1 |  | 5/2002  | Shamshoum et al. .... 526/124.9 |

FOREIGN PATENT DOCUMENTS

| JP | 2170803   |   | 7/1990 |
| JP | 03-033105 | * | 2/1991 |
| JP | 3033105   |   | 2/1991 |
| JP | 3033106   |   | 2/1991 |

* cited by examiner

*Primary Examiner*—Ling-Siu Choi
(74) *Attorney, Agent, or Firm*—Barlow, Josephs & Holmes, Ltd.

(57) ABSTRACT

The present invention relates to a method for producing a propylene polymer having a very high melt flowability, specifically to a method for producing an isotactic propylene polymer having a dramatically improved melt flowability with a relatively high production yield in convenient way, by improving the reactivity of hydrogen that is served as a molecular weight controlling agent in propylene polymerization.

7 Claims, 1 Drawing Sheet

METHOD FOR PRODUCING PROPYLENE POLYMER HAVING A VERY HIGH MELT-FLOWABILITY

TECHNICAL FIELD AND BACKGROUND ART

The present invention relates to a method for producing a propylene polymer having a very high melt flowability, specifically to a method for producing an isotactic propylene polymer having a dramatically improved melt flowability with a relatively high production yield in convenient way, by improving the reactivity of hydrogen that is served as a molecular weight controlling agent in propylene polymerization.

In propylene polymerization, specifically using methods of gas phase polymerization, slurry polymerization and bulk polymerization, a catalyst system used is generally composed of a Ziegler-type catalyst component, alkylaluminum and an external electron donor. In typical catalyst systems for propylene polymerization as said, the function of an external electron donor is, as is well known, to improve the isotactic index, i.e. stereoregularity of resulted polymer products, by selectively poisoning or converting the active site of non-stereoregularity present on the surface of a solid catalyst. It means the stereoregularity of resulted propylene polymers as well as the polymerization activity and a molecular weight distribution thereof are dependent on the molecular structure of an external electron donor applied. Therefore, in order to improve these properties in a propylene polymer, there have been many conventional techniques which particularly use various silane compounds as an external electron donor.

For example, Japanese laid-open patent publication Nos. Heisei 3-33105 and Heisei 3-33106 disclose a method for preparing polypropylene having high stereoregularity by using triethylaluminum and dialkyldimethoxysilane compound as an external electron donor, alone or as a mixture, together with a solid catalyst component obtained from a carrier which has been prepared by reacting silica and dialkyl magnesium. However, the use of the dialkyldimethoxysilane compound as an external electron donor causes a problem of significant decrease in hydrogen reactivity.

As an another example, U.S. Pat. No. 4,952,649 discloses a method for producing polypropylene having high stereoregularity as much as having an isotactic index of 96-98%, by forming recrystallized particles of a solid catalyst through reacting a solution of magnesium chloride dissolved in 2-ethylhexyl alcohol, with titanium tetrachloride and dialkyl phthalate at −20-130° C., and polymerizing propylene monomers by using the obtained catalyst component together with triethylaluminum as a cocatalyst and various dialkyldialkoxysilanes as an external electron donor in a bulk polymerization process. Additionally, U.S. Pat. No. 6,384,160 discloses a method for producing polypropylene with an isotactic index of 92-98% by using a solid catalyst component which is obtained by reacting diethoxy magnesium with titanium tetrachloride and an internal electron donor, diisobutyl phthalate or diethyl phthalate, together with a cocatalyst, triethylaluminum and an external electron donor, dialkyldimethoxysilane.

However, when using the main catalyst components and the external electron donors disclosed in those above-mentioned U.S. patents, the reactivity of a molecular weight controlling agent such as hydrogen is not sufficient enough to obtain polypropylene having a melt flow rate of 50 g/10 minutes or more in practical. That is, when feeding a large amount of hydrogen into a polymerization reactor for compensating the insufficient hydrogen reactivity in a conventionally practiced process, there is a risk of explosion and the like owing to the designed pressure limit of the reactor, therefore the possible feeding amount of hydrogen is practically limited. By that reason, when using the main catalyst components and the external electron donors disclosed in the above-mentioned US patents, it is practically impossible to increase the hydrogen pressure to the extent that it is required for producing polypropylene having a high melt flow rate.

Additionally, a method of olefin polymerization which uses phenyltriethoxysilane as an external electron donor, disclosed in Japanese laid-open patent publication No. Showa 57-63311, has a problem of toxicity owing to phenyl groups released from the external electron donor after the polymerization, and a method of olefin polymerization which uses dialkyldimethoxysilane as an external electron donor, disclosed in Japanese laid-open patent publication No. Heisei 2-170803, cannot provide a polymer having a high melt index. Further, a method of olefin polymerization disclosed in Japanese laid-open patent publication No. Heisei 8-157520, which uses alkylalkoxysilane substituted with cycloalkyl groups as an internal electron donor, may provide a polymer having a rather high melt flow rate, however, it has a problem of relatively too low catalyst activity.

SUMMARY OF THE INVENTION

The present invention has been made to solve the above-described problems in the prior arts. Accordingly, the objective of the invention is to provide a method for producing a propylene polymer with a relatively high production yield in convenient way, in propylene polymerization using a Ziegler catalyst system, wherein the propylene polymer has a sufficiently high isotactic index of 97% or more for commercial use and shows a still higher melt flow rate than in conventional techniques when the same amount of hydrogen is fed into a reactor, owing to the dramatically increased reactivity of hydrogen, a molecular weight controlling agent.

DETAILED DESCRIPTION OF THE INVENTION

Figure 1:
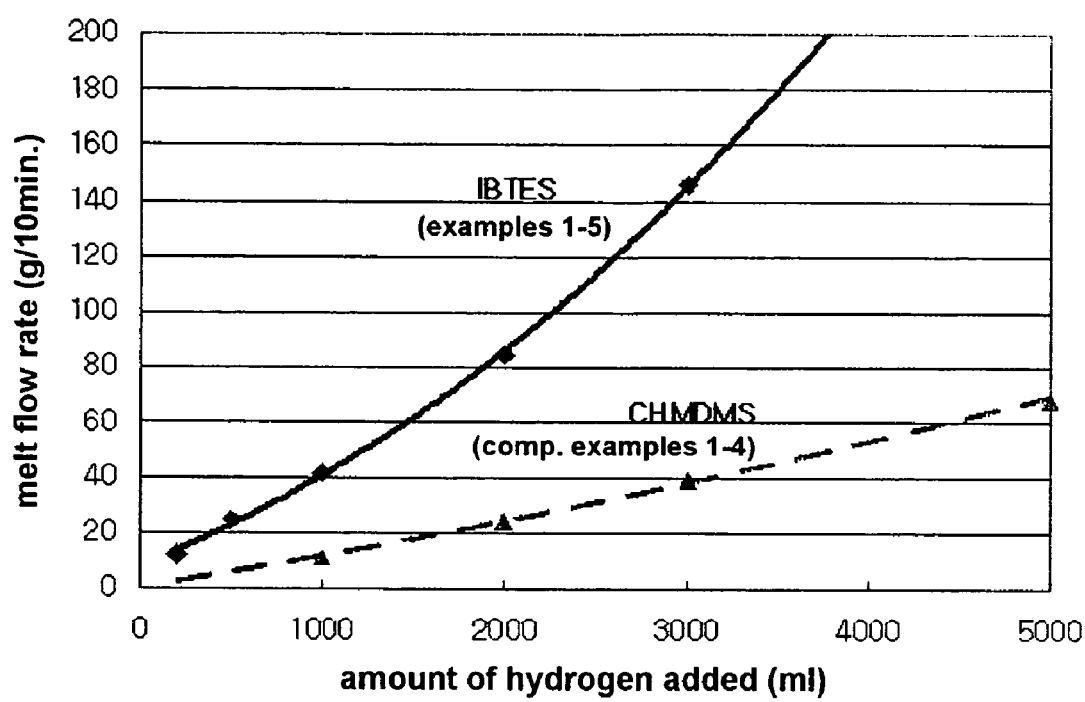
FIG. 1 is a plot showing the relationship between the amount of hydrogen used and the melt flow rate, in order to compare the hydrogen reactivities according to the species of the external electron donors, based on the results from examples 1-5 and comparative examples 1-4 in the present invention.

According to the present invention, provided is a method for producing a propylene polymer by using a catalyst system for propylene polymerization, wherein the catalyst system comprises: a Ziegler-type catalyst as main catalyst component comprising magnesium, titanium, halogen and internal electron donor; an alkylaluminum compound as cocatalyst; and external electron donor comprising alkyltrialkoxysilane compound.

In the catalyst system for propylene polymerization used in the method according to the present invention, the main catalyst component is a conventional Ziegler-type solid catalyst, preferably comprising magnesium, titanium, halogen and internal electron donor, and the composition ratio is not specifically limited and, preferably, as follows in terms of catalyst activity: 5-40 wt % of magnesium, 0.5-10 wt % of titanium, 50-85 wt % of halogen and 2.5-30 wt % of internal electron donor.

The source of magnesium included in said main catalyst component is not specifically limited. Therefore, any of magnesium compounds commonly used in the preparation of a Ziegler-type catalyst for olefin polymerization such as magnesium chloride, dialkoxy magnesium, alkoxymagnesium chloride and the like may be used in the preparation of said main catalyst component without limitation, and among them, dialkoxy magnesium is preferably used. The dialkoxy magnesium may be obtained from the reaction of magnesium metal with alcohol, and is served as a carrier having a form of spherically shaped particles, wherein the spherical shape is maintained still during the propylene polymerization.

For a source of titanium included in the main catalyst component, it is not also specifically limited, and any of titanium compounds commonly used in the preparation of a Ziegler-type catalyst for olefin polymerization may be used in the preparation of said main catalyst component without limitation, but specifically, titanium tetrachloride is preferably used.

For the internal electron donor included in the main catalyst component, it is not specifically limited, and any of compounds useful as an internal electron donor in the preparation of a Ziegler-type catalyst for olefin polymerization, for example alcohols, ethers, ketones, carboxylic acids and the like may be used in the preparation of said main catalyst component without limitation. Among the commonly used internal electron donors, it is preferred to use carboxylic acids, and it is more preferred to use at least one selected from benzene-1,2-dicarboxylic acid ester compounds, i.e. dialkylphthalate compounds represented by a general formula of $Ph(COOR^1)(COOR^2)$ wherein Ph is phenyl group and $R^1$ and $R^2$ are independently alkyl groups having C1-C10, or mixtures thereof. Specific examples of the benzene-1,2-dicarboxylic acid ester compounds i.e. dialkylphthalate compounds include dimethyl phthalate, diethyl phthalate, di-n-propyl phthalate, diisopropyl phthalate, di-n-butyl phthalate, diisobutyl phthalate, di-n-pentyl phthalate, di(2-methylbutyl)phthalate, di(3-methylbutyl)phthalate, di-neopentyl phthalate, di-n-hexyl phthalate, di(2-methylpentyl)phthalate, di(3-methylpentyl)phthalate, diisohexyl phthalate, dineohexyl phthalate, di(2,3-dimethylbutyl) phthalate, di-n-heptyl phthalate, di(2-methylhexyl) phthalate, di(2-ethylpentyl)phthalate, diisoheptyl phthalate, dineoheptyl phthalate, di-n-octyl phthalate, di(2-ethylhexyl) phthalate, di(2-methylheptyl)phthalate, diisooctyl phthalate, di(3-ethylhexyl)phthalate, dineooctyl phthalate, di-n-nonyl phthalate, diisononyl phthalate, di-n-decyl phthalate, diisodecyl phthalate and the like.

The preparation method of said main catalyst component is not specifically limited, and the catalyst may be prepared by conventional methods for preparing a Ziegler-type catalyst for olefin polymerization. For example, the main catalyst component may be prepared by: suspending a magnesium source compound and a titanium source compound into an aliphatic or an aromatic hydrocarbon solvent such as octane, nonane, decane, toluene, xylene and the like in a reactor, which has been conditioned by removing moisture sufficiently under inert gas atmosphere and equipped with a stirrer; adding internal electron donor thereto; reacting the resultant mixture at 90-130° C., and then optionally contacting with an additional titanium compound; and washing with an organic solvent. If necessary, one or more steps in said procedure may be repeated twice or more.

In the catalyst system for the propylene polymerization used in the preparation of a propylene polymer according to the present invention, as the cocatalyst component, alkylaluminum compounds useful in propylene polymerization may be used, and among them, alkylaluminum compounds represented by a general formula of $AlR^3_3$, wherein $R^3$ is an alkyl group having C1-C4, may be preferably used. Specific examples of said alkylaluminum compounds include trimethylaluminum, triethylaluminum, tripropylaluminum, tributylaluminum, triisobutylaluminum and the like.

In the catalyst system for the propylene polymerization used in the preparation of a propylene polymer according to the present invention, the external electron donor comprising alkyltrialkoxysilane compound is used in order to obtain the effect of improving the reactivity of hydrogen added during the polymerization as a molecular weight controlling agent. Among the alkyltrialkoxysilane compounds, it is preferred to use alkyltrialkoxysilane represented by a general formula $R^4Si(OR^5)_3$, wherein $R^4$ is an alkyl or cycloalkyl group having C1-C12, and $R^5$ is an alkyl group having C1-C4, and among them, it is more preferred to use alkyltriethoxysilane wherein $R^4$ is an alkyl or cycloalkyl group having C3-C7 and $R^5$ is an ethyl group.

Also, in the present invention, the external electron donor may comprise alkyltrialkoxysilane compound and dialkyldialkoxysilane compound, and preferably, the dialkyldialkoxysilane compound is represented by $R^6R^7Si(OR^8)_2$ wherein $R^6$ and $R^7$ are independently alkyl or cycloalkyl groups having C1-C12 and $R^8$ is an alkyl group having C1-C4, and more preferably, the dialkyldialkoxysilane compound is dicyclopentyldimethoxysilane.

Specific examples of the alkyltrialkoxysilane compound may include $i\text{-}C_3H_7Si(OCH_3)_3$, $i\text{-}C_4H_9Si(OCH_3)_3$, $t\text{-}C_4H_9Si(OCH_3)_3$, $(cyclohexyl)Si(OCH_3)_3$, $CH_3Si(OC_2H_5)_3$, $C_2H_5Si(OC_2H_5)_3$, $n\text{-}C_3H_7Si(OC_2H_5)_3$, $i\text{-}C_3H_7Si(OC_2H_5)_3$, $n\text{-}C_4H_9Si(OC_2H_5)_3$, $i\text{-}C_4H_9Si(OC_2H_5)_3$, $sec\text{-}C_4H_9Si(OC_2H_5)_3$, $t\text{-}C_4H_9Si(OC_2H_5)_3$, $n\text{-}C_5H_{11}Si(OC_2H_5)_3$, $(i\text{-}C_5H_{11})Si(OC_2H_5)_3$, $(neo\text{-}C_5H_{11})Si(OC_2H_5)_3$, $(cyclopentyl)Si(OC_2H_5)_3$, $n\text{-}C_6H_{13}Si(OC_2H_5)_3$, $(cyclohexyl)Si(OC_2H_5)_3$, $(cycloheptyl)Si(OC_2H_5)_3$, $i\text{-}C_3H_7Si(OC_3H_7)_3$, $n\text{-}C_4H_9Si(OC_3H_7)_3$, $i\text{-}C_4H_9Si(OC_3H_7)_3$, or $n\text{-}C_7H_{15}Si(OC_3H_7)_3$, and the alkyltrialkoxysilane may be used alone or as a mixture thereof.

In the catalyst system for the propylene polymerization used in the method according to the present invention, for the ratio of the cocatalyst component to the main catalyst component, the molar ratio of the aluminum atom in the cocatalyst component to the titanium atom in the main catalyst component is preferably in the range of 1-1000 and more preferably in the range of 10-300, though it may be varied to a certain extent depending on the specific polymerization method applied. If the molar ratio of the aluminum atom in the cocatalyst component to the titanium atom in the main catalyst component goes beyond the range of 1-1000, the polymerization activity becomes rapidly decreased.

In the catalyst system for the propylene polymerization used in the method according to the present invention, for the ratio of the external electron donor to the main catalyst component, the molar ratio of the silicon atom in the external electron donor to the titanium atom in the main catalyst component is preferably in the range of 0.1-500 and more preferably in the range of 1-100, though it may be varied to a certain extent depending on the specific polymerization method applied. When the molar ratio of the silicon atom in the external electron donor to the titanium atom in the main catalyst component is less than 0.1, the stereoregularity of the resulted propylene polymer becomes significantly lowered, and when the molar ratio is more than 500, the polymerization activity becomes considerably decreased.

In the method for producing a propylene polymer according to the present invention, the polymerization temperature is preferably 40-120° C. When the temperature is lower than 40° C., the reaction is not sufficiently carried out, and when the temperature is higher than 120° C., it will give adverse effects to the physical properties of the resulted polymer.

The method for producing a propylene polymer according to the present invention may be effectively applicable to the preparation of a propylene copolymer with an alpha-olefin having carbon atoms of 2-6 (excluding 3) as well as a homopolymer of propylene.

According to the method for producing a propylene polymer of the present invention, it is possible to obtain a propylene polymer having high stereoregularity with 97% or more of an isotactic index and excellent melt flowability.

Hereinafter, the present invention is further described in detail through specific examples given below, however the scope of the present invention is not limited by those examples with only illustrative purpose.

EXAMPLE 1

[Preparation of Main Catalyst Component]

To a 1L glass reactor equipped with stirrer which has been sufficiently substituted with nitrogen, 200 ml of toluene and diethoxy magnesium (25 g, 0.219 mol) were added and stirred at 250 rpm while maintaining the temperature at 10° C. 75 ml of titanium tetrachloride was added thereto over 30 minutes, and then, the temperature of the reactor was elevated to 110° C. at the speed of 0.5° C. per minute, and during the temperature elevation, 7.5 ml of diisobutyl phthalate (DIBP) (0.028 mol) was further added when the temperature was reached to 25° C. The resulted mixture was allowed to react at 110° C. for 1 hour with stirring, and then remained still without stirring so that solid products may settle down. The supernatant liquid was removed therefrom and the precipitates were washed by adding 250 ml of fresh toluene and stirring for 15 minutes. The same washing procedure was repeated once more.

To the resulted solid product, 200 ml of toluene was again added, then 75 ml of titanium tetrachloride and 5.0 ml of DIBP were again added in series thereto with stirring at 250 rpm while maintaining the temperature at 80° C., and the temperature of the reactor was elevated to 110° C. over 30 minutes, and then maintained the mixture at 110° C. for 1 hour. Then, the stirring was stopped, the supernatant liquid was removed therefrom, and 250 ml of fresh toluene was further added for washing as the same procedure as described above.

To the solid product obtained above, 250 ml of toluene at 100° C. was further added, and the mixture was washed once again as the same method as described above. The mixture was further washed 6 times more with each 250 ml of n-hexane at 40° C. to obtain pale yellow solid as a main catalyst component. The titanium content of the solid main catalyst component dried under nitrogen stream for 8 hours was 2.6 wt %.

[Propylene Polymerization]

A vial containing 5 mg of the catalyst obtained above was loaded in a 2L stainless reactor for high pressure, and after the reactor was sufficiently substituted with nitrogen, 7.0 mmol of triethylaluminum as a cocatalyst and 0.7 mmol of isobutyltriethoxy silane (IBTES) as an external electron donor were added to the reactor. Then, 1000 ml of hydrogen and 1.2L of liquid propylene were added to the reactor in series, and the stirrer was operated to break the vial inside the reactor simultaneously with the rotation of the stirrer and to accordingly start polymerization. From this stage, the temperature was raised to 70° C., and the polymerization was carried out at 70° C. for 1 hour. After completion of the polymerization reaction, unreacted propylene was thoroughly degassed to obtain a propylene homopolymer.

The polymerization activity per hour was estimated with the weight of the obtained propylene homopolymer, and isotactic index (I.I), melt flow rate (MFR) and melting point of the polymer were measured. The results are represented in Table 1 below.

Particularly, the polymerization activity, isotactic index, melt flow rate and melting point were measured by following specific methods.

① Polymerization activity per time (kg/g-catalyst):

Weight of polymer produced per hour(kg)/Weight of catalyst used(g)

② Isotactic index (I.I) (%):

100—grams of insoluble components crystallized in mixed xylene when 100 g of polymer was dissolved in mixed xylene ③ Melt flow rate (MFR) (g/10 min.):

Measured at 230° C., under a load of 2.16 kg, according to ASTM D1238.

④ Melting point (° C.):

Measured at the rate of temperature elevation of 10° C./min with DSC.

EXAMPLES 2~5

A propylene polymer was prepared by using the same catalyst system and the same method as in Example 1 above, except that the amount of hydrogen used in the [propylene polymerization] step was changed to 200 ml, 500 ml, 2000 ml and 3000 ml, respectively.

With the obtained respective propylene polymer, polymerization activity, isotactic index, melt flow rate and melting point thereof were determined by the same method as in Example 1 above, and the results were represented in Table 1 below.

Examples 6~8

A propylene polymer was prepared by using the same catalyst system and the same method as in Example 1 above, except that in the [propylene polymerization] step, the amount of hydrogen was changed to 500 ml, the amount of isobutyltriethoxysilane (IBTES) as an external electron donor was changed to 0.3 mmol, 0.5 mmol and 1.4 mmol, respectively.

With the obtained respective propylene polymer, polymerization activity, isotactic index, melt flow rate and melting point thereof were determined by the same method as in Example 1 above, and the results were represented in Table 1 below.

Examples 9~21

A propylene polymer was prepared by using the same main catalyst and cocatalyst components and the same method as in Example 1 above, but in the [propylene polymerization] step,
0.7 mmol of isopropyltriethoxysilane (IPTES),
0.7 mmol of t-butyltriethoxysilane (TBTES),
0.7 mmol of cyclohexyltriethoxysilane (CHTES),
0.7 mmol of n-butyltriethoxysilane (NBTES),
0.7 mmol of n-propyltriethoxysilane (NPTES),
0.7 mmol of ethyltriethoxysilane (ETES),
0.7 mmol of isopropyltrimethoxysilane (IPTMS),
0.7 mmol of isobutyltrimethoxysilane (IBTMS),
0.7 mol of t-butyltrimethoxy silane (TBTMS),
0.7 mmol of cyclohexyltrimethoxysilane (CHTMS),
0.7 mmol of iso-butyltripropoxysilane (IBTPS),
0.7 mmol of iso-propyltripropoxysilane (IPTPS) and
0.7 mmol of n-butyltripropoxysilane (NBTPS)

were used respectively as an external electron donor, instead of 0.7 mmol of isobutyltriethoxysilane (IBTES) in Example 1.

With the obtained respective propylene polymer, polymerization activity, isotactic index, melt flow rate and melting point thereof were determined by the same method as in Example 1 above, and the results were represented in Table 1 below.

COMPARATIVE EXAMPLE 1

A propylene polymer was prepared by using the same main catalyst and cocatalyst components and the same method as in Example 1 above, but in the [propylene polymerization] step, 0.7 mmol of cyclohexylmethyldimethoxysilane (CHMDMS) was used as an external electron donor, instead of 0.7 mmol of isobutyltriethoxysilane (IBTES) in Example 1.

With the obtained propylene polymer, polymerization activity, isotactic index, melt flow rate and melting point thereof were determined by the same method as in Example 1 above, and the results were represented in Table 1 below.

COMPARATIVE EXAMPLES 2~4

A propylene polymer was prepared by using the same catalyst system and the same method as in Example 1 above, but in the [propylene polymerization] step, 0.7 mmol of cyclohexylmethyldimethoxysilane (CHMDMS) was used as an external electron donor instead of 0.7 mmol of isobutyltriethoxysilane (IBTES) in Example 1, and the amount of hydrogen used was changed to 2000 ml, 3000 ml and 5000 ml, respectively.

With the obtained respective propylene polymer, polymerization activity, isotactic index, melt flow rate and melting point thereof were determined by the same method as in Example 1 above, and the results were represented in Table 1 below.

TABLE 1

| Unit | | External electron donor species | amount (mmol) | Hydrogen (ml) | Polymerization activity per hour (kg/g-catalyst) | I.I (%) | MFR (g/10 min.) | Melting point (° C.) |
|---|---|---|---|---|---|---|---|---|
| EXAMPLE | 1 | IBTES | 0.7 | 1000 | 43.1 | 98.2 | 41.5 | 160.9 |
| | 2 | IBTES | 0.7 | 200 | 37.8 | 98.3 | 12.0 | 161.3 |
| | 3 | IBTES | 0.7 | 500 | 37.7 | 98.1 | 24.6 | 161.6 |
| | 4 | IBTES | 0.7 | 2000 | 41.4 | 97.7 | 84.5 | 160.4 |
| | 5 | IBTES | 0.7 | 3000 | 44.0 | 98.0 | 145.9 | 160.9 |
| | 6 | IBTES | 0.3 | 500 | 34.8 | 96.8 | 31.8 | 160.5 |
| | 7 | IBTES | 0.5 | 500 | 34.8 | 97.2 | 26.1 | 160.8 |
| | 8 | IBTES | 1.4 | 500 | 28.8 | 97.9 | 19.0 | 161.2 |
| | 9 | IPTES | 0.7 | 1000 | 38.5 | 97.6 | 45.5 | 160.5 |
| | 10 | TBTES | 0.7 | 1000 | 45.8 | 98.4 | 35.6 | 161.7 |
| | 11 | CHTES | 0.7 | 1000 | 42.3 | 98.1 | 38.8 | 161.0 |
| | 12 | NBTES | 0.7 | 1000 | 32.5 | 97.0 | 50.5 | 160.5 |
| | 13 | NPTES | 0.7 | 1000 | 30.8 | 96.5 | 53.2 | 160.0 |
| | 14 | ETES | 0.7 | 1000 | 24.2 | 95.6 | 61.8 | 160.1 |
| | 15 | IPTMS | 0.7 | 1000 | 30.8 | 96.5 | 48.1 | 159.8 |
| | 16 | IBTMS | 0.7 | 1000 | 33.5 | 97.2 | 39.3 | 160.4 |
| | 17 | TBTMS | 0.7 | 1000 | 34.2 | 97.4 | 32.7 | 160.7 |
| | 18 | CHTMS | 0.7 | 1000 | 34.0 | 97.3 | 34.2 | 160.3 |
| | 19 | IBTPS | 0.7 | 1000 | 41.1 | 95.2 | 67.1 | 157.8 |
| | 20 | IPTPS | 0.7 | 1000 | 39.6 | 95.8 | 75.2 | 159.5 |
| | 21 | NBTPS | 0.7 | 1000 | 38.5 | 96.2 | 70.3 | 157.2 |
| COMP. EXAMPLE | 1 | CHMDMS | 0.7 | 1000 | 42.8 | 97.8 | 11.0 | 161.8 |
| | 2 | CHMDMS | 0.7 | 2000 | 44.6 | 98.0 | 23.9 | 161.6 |
| | 3 | CHMDMS | 0.7 | 3000 | 44.2 | 97.9 | 38.8 | 161.2 |
| | 4 | CHMDMS | 0.7 | 5000 | 37.5 | 97.9 | 68.4 | 161.3 |

EXAMPLES 22~28

A propylene polymer was prepared by using the same main catalyst and cocatalyst components and the same method as in Example 1 above, but in the [propylene polymerization] step,
0.55 mmol of IBTES+0.15 mmol of dicyclopentyldimethoxysilane (DCPDMS),
0.45 mmol of IBTES+0.25 mmol of DCPDMS,
0.35 mmol of IBTES+0.35 mmol of DCPDMS,
0.25 mmol of IBTES+0.45 mmol of DCPDMS,
0.15 mmol of IBTES+0.55 mmol of DCPDMS, 0.35 mmol of IPTES+0.35 mmol of DCPDMS and 0.35 mmol of NBTES+0.35 mmol of DCPDMS were used respectively as external electron donor, instead of 0.7 mmol of isobutyltriethoxysilane (IBTES) in Example 1.

With the obtained respective propylene polymer, polymerization activity, isotactic index, melt flow rate and melting point thereof were determined by the same method as in Example 1 above, and the results were represented in Table 2 below.

COMPARATIVE EXAMPLE 5

A propylene polymer was prepared by using the same main catalyst and cocatalyst components and the same method as in Example 1 above, but in the [propylene polymerization] step, 0.7 mmol of dicyclopentyldimethoxysilane (DCPDMS) was used as an external electron donor, instead of 0.7 mmol of isobutyltriethoxysilane (IBTES) in Example 1.

With the obtained propylene polymer, polymerization activity, isotactic index, melt flow rate and melting point thereof were determined by the same method as in Example 4 above, and the results were represented in Table 2 below.

polymerization, an alkylaluminum cocatlyst component and external electron donor, the examples 1-21 in which alkyltrialkoxysilane compounds are used as an external electron donor can provide propylene polymers having much higher melt flow rate with a small amount of hydrogen owing to the significantly improved reactivity of hydrogen, a molecular weight controlling agent, as compared to the comparative examples 1-4 in which a conventional external electron donor, cyclohexylmethyldimethoxy silane, is used.

Also, from the results shown in Table 2, the examples 22-28 in which alkyltrialkoxysilane compounds are used together with dicyclopentyldimethoxysilane (DCPDMS) as external electron donor can provide propylene polymers having higher melt flow rate with a same amount of hydrogen owing to the improved reactivity of hydrogen, a molecular weight controlling agent, as compared to the comparative example 5 in which a conventional external electron donor, dicyclopentyldimethoxysilane (DCPDMS), is used alone.

INDUSTRIAL APPLICABILITY

As seen from above, according the present invention, a propylene polymer having high isotactic index of 97% or

TABLE 2

| Unit | | External electron donor species 1; species 2 | amount (mmol) | Hydrogen (ml) | Polymerization activity per hour (kg/g-catalyst) | I.I (%) | MFR (g/10 min.) | Melting point (° C.) |
|---|---|---|---|---|---|---|---|---|
| EXAMPLE | 22 | IBTES; DCPDMS | 0.55; 0.15 | 2000 | 43.3 | 98.3 | 55.8 | 161.8 |
| | 23 | IBTES; DCPDMS | 0.45; 0.25 | 2000 | 47.5 | 98.6 | 28.8 | 162.6 |
| | 24 | IBTES; DCPDMS | 0.35; 0.35 | 2000 | 54.1 | 98.9 | 9.2 | 163.0 |
| | 25 | IBTES; DCPDMS | 0.25; 0.45 | 2000 | 55.0 | 98.7 | 6.8 | 162.2 |
| | 26 | IBTES; DCPDMS | 0.15; 0.55 | 2000 | 54.7 | 98.5 | 5.2 | 162.5 |
| | 27 | IPTES; DCPDMS | 0.35; 0.35 | 2000 | 52.4 | 98.8 | 7.0 | 163.1 |
| | 28 | NBTES; DCPDMS | 0.35; 0.35 | 2000 | 47.9 | 98.8 | 12.5 | 162.5 |
| COMP. EXAMPLE | 5 | DCPDMS | 0.7 | 2000 | 52.1 | 98.5 | 4.8 | 161.8 |

Further, for comparing the hydrogen reactivities according to the species of the external electron donors based on the results of examples 1-5 and comparative examples 1-4 shown in the above table 1, a plot showing the relationship between the amount of hydrogen used and the melt flow rate is illustrated in FIG. 1. In the plot of FIG. 1, the slope is provided as an indicator of the hydrogen reactivity. According to FIG. 1, it can be found that the slope of the case of using an alkyltrialkoxysilane compound as an external electron donor was significantly larger than that of the case of using a cyclohexylmethyldimethoxysilane as an external electron donor. It means that the reactivity of hydrogen, a molecular weight controlling agent, becomes dramatically improved in the present invention, and thus a propylene polymer having much higher melt flow rate can be obtained even though the same amount of hydrogen was used.

From the results shown in Table 1 and FIG. 1, in the propylene polymerization using a catalyst system comprised of a Ziegler-type main catalyst component for propylene more and a relatively high melt flow rate can be conveniently prepared with a relatively high production yield. Therefore, in applying this method to a commercial industrial process, a propylene polymer having a melt flow rate in the far greater range can be advantageously prepared by using the conventional device and polymerization conditions conveniently.

What is claimed is:

1. A method for producing a propylene polymer by using a catalyst system for propylene polymerization, wherein the catalyst system comprises: a Ziegler-type catalyst as main catalyst component comprising magnesium, titanium, a halogen and an internal electron donor; an alkylaluminum compound as cocatalyst; and an external electron donor comprising an alkyltrialkoxysilane compound selected from the group consisting of: i-$C_3H_7Si(OCH_3)_3$, i-$C_4H_9Si(OCH_3)_3$, i-$C_3H_7Si(OC_2H_5)_3$ i-$C_4H_9Si(OC_2H_5)_3$, i-$C_5H_{11}Si(OC_2H_5)_3$, i-$C_3H_7Si(OC_3H_7)_3$, i-$C_4H_9Si(OC_3H_7)_3$, and mixtures thereof.

2. The method for producing a propylene polymer according to claim 1, wherein the main catalyst component comprises 5-40 wt % of magnesium, 0.5-10 wt % of titanium, 50-85 wt % of halogen and 2.5-30 wt % of an internal electron donor.

3. The method according to claim 1, wherein the internal electron donor is at least one selected from dialkylphthalate compounds represented by a general formula of $Ph(COOR^1)(COOR^2)$, wherein Ph is phenyl group and $R^1$ and $R^2$ are independently alkyl groups having C1-C10.

4. The method according to claim 3, wherein the dialkylphthalate compound is at least one selected from the group consisting of dimethyl phthalate, diethyl phthalate, di-n-propyl phthalate, diisopropyl phthalate, di-n-butyl phthalate, diisobutyl phthalate, di-n-pentyl phthalate, di(2-methylbutyl)phthalate, di(3-methylbutyl)phthalate, di-neopentyl phthalate, di-n-hexyl phthalate, di(2-methylpentyl)phthalate, di(3-methylpentyl)phthalate, diisohexyl phthalate, dineohexyl phthalate, di(2,3-dimethylbutyl)phthalate, di-n-heptyl phthalate, di(2-methylhexyl)phthalate, di(2-ethylpentyl)phthalate, diisoheptyl phthalate, dineoheptyl phthalate, di-n-octyl phthalate, di(2-ethylhexyl)phthalate, di(2-methylheptyl)phthalate, diisooctyl phthalate, di(3-ethylhexyl)phthalate, dineooctyl phthalate, di-n-nonyl phthalate, diisononyl phthalate, di-n-decyl phthalate and diisodecyl phthalate.

5. The method according to claim 1, wherein the cocatalyst component is an alkylaluminum compound represented by a general formula of $AlR^3{}_3$, wherein $R^3$ is an alkyl group having C1-C4.

6. The method according to claim 1, wherein the molar ratio of the aluminum atom in the co-catalyst component to the titanium atom in the main catalyst component is in the range of 1-1000.

7. The method according to claim 1, wherein the molar ratio of the silicon atom in the external electron donor to the titanium atom in the main catalyst component is in the range of 0.1-500.

* * * * *